United States Patent [19]

Watts, Jr.

[11] 4,139,698

[45] Feb. 13, 1979

[54] AMINATED STARCH DERIVATIVES

[75] Inventor: Lewis W. Watts, Jr., Austin, Tex.

[73] Assignee: Texaco Development Corporation, New York, N.Y.

[21] Appl. No.: 828,799

[22] Filed: Aug. 29, 1977

[51] Int. Cl.$^2$ .............................................. C08B 31/08
[52] U.S. Cl. .............................. 536/50; 260/17.4 ST; 536/45
[58] Field of Search ................................... 536/45, 50

[56] References Cited

U.S. PATENT DOCUMENTS 2,563,526   8/1951   Gaver et al. ............................ 536/45

*Primary Examiner*—Melvyn I. Marquis
*Attorney, Agent, or Firm*—Carl G. Ries; Thomas H. Whaley; James L. Bailey

[57] ABSTRACT

Covers an aminated starch derivative prepared by the reductive amination of an oxidized starch by reaction with ammonia or ammonium hydroxide. Also, covers a process of preparing said derivative.

6 Claims, No Drawings

AMINATED STARCH DERIVATIVES

BACKGROUND OF THE INVENTION

1. Field of the Invention

This invention is concerned with amino starch derivatives useful in the water treatment field of application and others. The present invention is also concerned with a process of preparing said amino starch derivatives.

2. Description of the Prior Art

The art is replete with various classes of polymeric amines and their method of preparation. However, there is an ever ongoing effort to provide relatively inexpensive, easy to manufacture sources of polymeric amines which may have utility in diverse applications, and contain a sufficiently high nitrogen content to possess the requisite degree of utility.

It therefore becomes an object of the invention to provide a new class of amine polymers derived from starches.

SUMMARY OF THE INVENTION

In accordance with the present invention a new class of aminated starch derivatives is provided. These derivatives are prepared by the reductive amination of an oxidized starch by catalytic means through reaction of said oxidized starch with ammonia or ammonium hydroxide.

DETAILED DESCRIPTION OF THE INVENTION

The first step in the invention is to provide a source of an oxidized starch. These materials are well known in the art and need little elaboration. Essentially, starches of this class contain carbonyl or carbonyl and carboxyl groups and are obtained by controlled oxidation of starch bases. The starch base or source may be from a variety of amylaceous substances such as corn, high amylose corn, wheat, potato, tapioca, waxy maize, sago, and rice as well as from the amylose and amylopectin fractions of starch.

The starch base is then oxidized with a variety of known oxidizing agents useful here, such as, sodium hypochlorite, compounds yielding periodate ions in solution, such as periodic acid, sodium meta periodate, potassium meta periodate, or the like, and other oxidizing agents such as lead tetraacetate or similarly, red lead (lead tetraoxide) in the presence of acetic acid. Preferred oxidized starches here are those prepared by the periodate oxidation of starch yielding oxidized starch compounds generally known as "dialdehyde starch". Typical ways of preparing dialdehyde starches are set out by E. L. Jackson and C. S. Hudson, J. Am. Chem. Soc., 59, 2049 (1937) and in U.S. Pat. No. 2,606,188. When an oxidized starch containing both carbonyl and carboxyl groups is desired a typical method may be followed as set out in U.S. Pat. No. 3,450,692.

The oxidized starch is then reacted with ammonia or ammonia hydroxide in presence of a suitable reductive amination catalyst to produce the desired starch amine product. A wide number of known catalysts of this type are useful here. Preferred are nickel and cobalt-based catalysts, with the most preferred being a nickel-based catalyst, including Raney nickel and nickel in combination with other metals or oxides of metals.

The above-described oxidized starches are reacted with ammonia or ammonium hydroxide (preferably ammonia) in the presence of said hydrogenation-dehydrogenation catalyst at elevated temperatures in the presence of hydrogen to form the aminated starches of the invention. Suitable reactors include either a closed autoclave resulting in a batch process or a tubular reactor which can be operated in a continuous manner. Either is suitable for the practice of this invention.

As just noted the class of useful catalysts here is well known and may include one or more of the metals including copper, nickel, cobalt, chromium, aluminum, manganese, platinum, palladium and rhodium and the oxides of these metals. The metals or their oxides may be empolyed in combination with normally nonreducible metal oxides such as chromium oxide, molybdenum oxide and manganese oxide. The amount of the nonreducible oxide employed may be varied considerably and some catalysts, notably those based upon cobalt require the presence of no nonreducible metal oxides.

One preferred catalyst that is very effective for the amination reaction, includes the metals or oxides of nickel, cobalt and chromium. A particularly satisfactory catalyst is one in which the active ingredients consist essentially, in mole percentages on an oxide-free basis of 60–85 percent nickel, 14–37 percent copper and 1–5 percent chromium as produced in accordance with procedures described in U.S. Pat. No. 3,152,998. As used herein this catalyst will be referred to as a nickel-copper-chromium catalyst.

The reductive amination reaction is carried out from 160° to 250° C. The reaction pressures are from 750 to about 4000 psig with a hydrogen partial pressure of at least 200 psig. The preferred pressure range is from about 1000 to about 2500 psig and a hydrogen partial pressure from about 200 to about 2000 psig.

The residence time in the reactor to be used to produce the amino starches of the invention are those which would occur at space velocities of about 0.2 to about 3.0 volume of reactants per volume of catalyst per hour, with the preferred space velocity being from about 1.0 to about 2.0. The space velocity herein described is in $cm^3$/volume of catalyst ($cm^3$)/hour, but rates in equivalent units are equally applicable.

The ratio of reactants, i.e., oxidized starch and the ammonia can vary over a wide range to produce the amine polymers of the invention. The feed rate of the oxidized starch expressed here in terms of weight per hour, can vary from about one times the ammonia feed rate to from about 0.2 times the ammonia feed rate.

The amount of amine introduced into the oxidized starch may vary quite widely without departing from the scope thereof. Thus, the starch derivative may comprise a starch unit having substituted thereon at least a small but detectable amount of said amino substituent group. The D. S. then (degree of substitution) may range as low as stated above to as high as 3.0 in terms of an average figure based on the anhydroglucose unit present in starch. More preferably, products are made having a D. S. ranging from about 0.001 to about 3.0 and most preferably ranging from about 0.001 to about 0.5.

The oxidized starch, of course, may contain both hydroxyl and carbonyl (and additionally carboxyl) functions. Due to order of reactivity the aldehyde function is preferably transformed into an amine function. However, the hydroxyl groups are also converted in the reductive amination to amino groups as well as some of the carboxyl groups.

The reductive amination of the oxidized starch with anhydrous ammonia or ammonium hydroxide may be effected without benefit of a solvent or in the presence of a solvent such as water, alcohol, etc. If run in a solvent, the solids content of the oxidized starch may vary over a wide range, say about 10 percent by weight up to about 60 percent by weight.

The aminated starch derivatives defined here are useful chemical intermediates, and as well are additives useful without further modification in various industries, such as, for example, the leather, paper, adhesives and coatings industries. As an example, the starch derivatives are paper wet and dry strength agents. The starches may also be reacted with polymeric materials, such as polysaccharides, soluble proteins, synthetic polyamides, polyvinyl alcohol, polyvinyl pyrrolidone, polyvinyl acetates, etc. to form soluble films. Again, the derivatives are extremely useful as dye assistants in the textile industry or as finishing agents in that same area of technology. As a further example, the cationic starch derivatives resulting from the process of the invention may be useful as beater additives in the paper making process to provide increased pigment retention. In addition, the products of the invention may be employed as flocculants.

The above-described invention is more particularly set forth in the following example which is to be construed for purposes of illustration only and not for limitation of the invention. Obvious modifications of the following example can be made.

EXAMPLE I 100 grams of an oxidized starch was provided. This starch is marketed under the tradename SUMSTAR ®-190 by Miles Laboratories. Approximately 90% of the anhydroglucose units present in this corn starch had been oxidized to the dialdehyde form. To the oxidized starch was added 400 grams of ammonium hydroxide (28%) and 100 grams of prereduced nickel-copper-chromium catalyst containing 75 mole percent nickel, 23 mole percent copper and 2 mole percent chromium.

The resultant mixture was heated under hydrogen pressure in an autoclave at 120° C. for three hours (1750 psig), and then at 200° C. for two hours (2500 psig).

The resultant filtrate was subjected to vacuum stripping (60° C. pot temperature at 0.8 mm Hg.) and the isolated dark semi-solid material exhibited the following analysis, consistent with the formation of a diamine compound in 41% yield (basis nitrogen analysis):

Total Acetylatables: 8.5 meg/gm
Total Amines: 7.1 meg/gm
Primary Amines: 7.1 meg/gm
Percent Nitrogen: 17.3 percent (Theory 17.3 percent)

The invention is hereby claimed as follows:

1. An aminated starch derivative prepared by the reductive amination of an oxidized starch by reaction with ammonia or ammonium hydroxide in the presence of hydrogen at 160–250° C. and under pressure of 750–4000 psig and in presence of a reductive amination catalyst being selected from the group consisting of copper, nickel, cobalt, chromium, aluminum, maganese, platinum, palladium, and rhodium, oxides of said metals and mixtures thereof.

2. The derivative of claim 1 prepared by the reductive amination of an oxidized starch with ammonia.

3. The derivative of claim 1 prepared by the reductive amination of an oxidized starch with ammonium hydroxide.

4. The process of preparing an aminated starch derivative which comprises providing an oxidized starch and reductively aminating said oxidized starch with ammonia or ammonium hydroxide in presence of hydrogen at 160–250° C. and under pressure of 750–4000 psig and in the presence of a reducing catalyst being selected from the group consisting of copper, nickel, cobalt, chromium, aluminum, maganese, platinum, palladium, and rhodium, oxides of said metals and mixtures thereof.

5. The process of claim 4 wherein said catalyst is a nickel-based catalyst.

6. The process of claim 5 wherein said nickel-based catalyst is Raney nickel or a nickel-copper-chromium catalyst.

* * * * *